United States Patent
Ooishi et al.

(10) Patent No.: US 10,433,004 B2
(45) Date of Patent: Oct. 1, 2019

(54) RECEPTION APPARATUS, RECEIVING METHOD, AND PROGRAM

(71) Applicant: Sony Semiconductor Solutions Corporation, Kanagawa (JP)

(72) Inventors: Noriaki Ooishi, Kanagawa (JP); Satoshi Okada, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 15/558,366

(22) PCT Filed: Apr. 1, 2016

(86) PCT No.: PCT/JP2016/060896
§ 371 (c)(1),
(2) Date: Sep. 14, 2017

(87) PCT Pub. No.: WO2016/167139
PCT Pub. Date: Oct. 20, 2016

(65) Prior Publication Data
US 2018/0084299 A1    Mar. 22, 2018

(30) Foreign Application Priority Data
Apr. 13, 2015 (JP) .................. 2015-081609

(51) Int. Cl.
*H04N 7/173* (2011.01)
*H04N 21/434* (2011.01)
(Continued)

(52) U.S. Cl.
CPC ....... *H04N 21/4344* (2013.01); *H04N 21/242* (2013.01); *H04N 21/434* (2013.01);
(Continued)

(58) Field of Classification Search
CPC .......................... H04N 21/4344; H04N 21/44
(Continued)

(56) References Cited

U.S. PATENT DOCUMENTS 7,643,430 B2 * 1/2010 Morandin ............ H04J 3/0682
370/252
2005/0229217 A1 * 10/2005 Gin .................... H04N 7/20
725/63
(Continued)

FOREIGN PATENT DOCUMENTS

| JP | 2001-044957 A | 2/2001 |
| JP | 2009-094982 A | 4/2009 |
| JP | 2012-161032 A | 8/2012 |

*Primary Examiner* — Jivka A Rabovianski
(74) *Attorney, Agent, or Firm* — Michael Best & Friedrich LLP

(57) ABSTRACT

The present disclosure relates to a reception apparatus, a reception method, and a program for generating a time stamp with a simple circuit structure that is realized at low cost. In one example, a reception apparatus includes a reception unit, an obtaining unit, a time stamp increment value specifying unit, a time stamp calculating unit and a time stamp adding unit. The reception unit receives a data stream formed of a series of packets. The obtaining unit obtains a transmission parameter from the received data stream. The time stamp increment value specifying unit specifies a time stamp increment value corresponding to the obtained transmission parameter. The time stamp calculating unit updates the time stamp by adding the specified time stamp increment value to a previous time stamp, and the time stamp adding unit adds the updated time stamp to the packets configuring the data stream.

15 Claims, 13 Drawing Sheets

(51) Int. Cl.
 *H04N 21/435* (2011.01)
 *H04N 21/44* (2011.01)
 *H04N 21/242* (2011.01)
 *H04N 21/43* (2011.01)

(52) U.S. Cl.
 CPC ....... *H04N 21/4305* (2013.01); *H04N 21/435* (2013.01); *H04N 21/44* (2013.01)

(58) Field of Classification Search
 USPC .......................................... 725/63, 32, 131
 See application file for complete search history.

(56) References Cited

U.S. PATENT DOCUMENTS

| | | | | |
|---|---|---|---|---|
| 2007/0140398 A1* | 6/2007 | Inoue | ................... | H04J 3/0632 375/372 |
| 2008/0120424 A1* | 5/2008 | Deshpande | ............. | H04L 47/10 709/230 |
| 2013/0077642 A1* | 3/2013 | Webb, III | ............. | H03L 7/1974 370/503 |

* cited by examiner

FIG. 8

| NUMBER OF ALLOCATED SLOTS N (ADDRESS) | TIME STAMP INCREMENT VALUE | | |
|---|---|---|---|
| | INTEGER PART | DECIMAL PART | |
| | | NUMERATOR | DENOMINATOR |
| 1 | 37362 | 6 | 37 |
| 2 | 18681 | 3 | 37 |
| 3 | 12454 | 2 | 37 |
| 4 | 9340 | 20 | 37 |
| 5 | 7472 | 16 | 37 |
| 6 | 6227 | 1 | 37 |
| 7 | 5337 | 117 | 259 |
| 8 | 4670 | 10 | 37 |
| 9 | 4151 | 13 | 37 |
| 10 | 3736 | 8 | 37 |
| 11 | 3396 | 228 | 407 |
| 12 | 3113 | 19 | 37 |
| 13 | 2874 | 6 | 481 |
| 14 | 2668 | 188 | 259 |
| 15 | 2490 | 30 | 37 |
| 16 | 2335 | 5 | 37 |
| 17 | 2197 | 487 | 629 |
| 18 | 2075 | 25 | 37 |
| 19 | 1966 | 302 | 703 |
| 20 | 1868 | 4 | 37 |
| 21 | 1779 | 39 | 259 |
| 22 | 1698 | 114 | 407 |
| 23 | 1624 | 376 | 851 |
| 24 | 1556 | 28 | 37 |
| 25 | 1494 | 18 | 37 |
| 26 | 1437 | 3 | 481 |
| 27 | 1383 | 29 | 37 |
| 28 | 1334 | 94 | 259 |
| 29 | 1288 | 376 | 1073 |
| 30 | 1245 | 15 | 37 |
| 31 | 1205 | 265 | 1147 |
| 32 | 1167 | 21 | 37 |
| 33 | 1132 | 76 | 407 |
| 34 | 1098 | 558 | 629 |
| 35 | 1067 | 127 | 259 |
| 36 | 1037 | 31 | 37 |
| 37 | 1009 | 1079 | 1369 |
| 38 | 983 | 151 | 703 |
| 39 | 958 | 2 | 481 |
| 40 | 934 | 2 | 37 |
| 41 | 911 | 413 | 1517 |
| 42 | 889 | 149 | 259 |
| 43 | 868 | 1412 | 1591 |
| 44 | 849 | 57 | 407 |
| 45 | 830 | 10 | 37 |
| 46 | 812 | 188 | 851 |
| 47 | 794 | 1634 | 1739 |
| 48 | 778 | 14 | 37 |

RECEPTION APPARATUS, RECEIVING METHOD, AND PROGRAM

TECHNICAL FIELD

The present disclosure relates to a reception apparatus, a receiving method, and a program, and more particularly, for example, to a reception apparatus, a receiving method, and a program suitable for recording and re-distributing a broadcast transport stream (TS).

BACKGROUND ART

For example, in a field such as digital television broadcasting, network distribution of contents, and recording of contents, data such as video and audio is packetized and then multiplexed in a format which can be synchronously reproduced.

A MPEG-2 transport stream (referred to as TS below) has been widely used as a multiplexing format of data employed for the digital television broadcasting. A plurality of TS packets (fixed length of 188 bytes, simply referred to as packet below) connected in series forms the TS.

When the broadcast TS is recorded, as illustrated in FIG. 1, the TS is recorded after a reception side has added time stamps to all the packets. The time stamp expresses the time when each packet has arrived at the reception side (value about 27 MHz) and is used for controlling the reproduction timing at the time of reproduction after recording.

Conventionally, to generate the time stamp on the reception side, it has been necessary to provide a clock recovery circuit for synchronizing a system clock on the reception side (27 MHz) with a reference clock on the transmission side (27 MHz).

The clock recovery circuit includes a bit stream parser for extracting a program clock reference (PGR) from the TS, a phase lock loop (PLL) circuit for locking a system clock signal to the PCR, and a time stamp generating circuit for generating the time stamp on the basis of a clock counter value of the system clock signal (for example, refer to Patent Document 1).

CITATION LIST

Patent Document

Patent Document 1: Japanese Patent Application Laid-Open No. 2001-44957

SUMMARY OF THE INVENTION

Problems to be Solved by the Invention

As described above, in the reception apparatus for recording the received TS, it is necessary to provide the clock recovery circuit to generate the time stamp. However, the clock recovery circuit has a complicated circuit structure and is expensive. Therefore, a proposal of a mechanism which can accurately generate a time stamp with a simple circuit structure realizing low cost has been expected.

The present disclosure has been made in consideration of this situation, and the present disclosure is provided to generate a time stamp with a simple circuit structure realizing low cost.

Solutions to Problems

A reception apparatus which is one aspect of the present disclosure includes: a reception unit that receives a data stream formed of a series of packets; an obtaining unit that obtains a transmission parameter from the received data stream; a time stamp increment value specifying unit that specifies a time stamp increment value corresponding to the obtained transmission parameter; a time stamp calculating unit that updates the time stamp by adding the specified time stamp increment value to a previous time stamp; and a time stamp adding unit that adds the updated time stamp to the packets configuring the data stream.

The time stamp increment value specifying unit can include a transmission rate calculating unit that calculates the transmission rate on the basis of the obtained transmission parameter and a time stamp increment value calculating unit that calculates the time stamp increment value on the basis of the calculated transmission rate.

The time stamp increment value specifying unit can have a conversion table in which the time stamp increment value is associated with the obtained transmission parameter.

In a case where the obtained transmission parameter is changed, the time stamp increment value specifying unit can specify the time stamp increment value corresponding to the changed transmission parameter.

The time stamp calculating unit can initialize the time stamp in a case where a channel to receive the data stream is changed.

The transmission rate, the time stamp increment value, and the time stamp can be expressed as rational numbers.

The reception apparatus which is one aspect of the present disclosure can further include a packet selection unit that selectively outputs the packet to which the time stamp has been added.

A receiving method of a reception apparatus which is one aspect of the present disclosure includes: a receiving step of receiving a data stream formed of a series of packets by the reception apparatus; an obtaining step of obtaining a transmission parameter from the received data stream; a time stamp increment value specifying step of specifying a time stamp increment value corresponding to the obtained transmission parameter; a time stamp calculating step of updating the time stamp by adding the specified time stamp increment value to a previous time stamp; and a time stamp adding step of adding the updated time stamp to the packets configuring the data stream.

A program, that is one aspect of the present disclosure, is a program for causing a computer to function as: a reception unit that receives a data stream formed of a series of packets; an obtaining unit that obtains a transmission parameter from the received data stream; a time stamp increment value specifying unit that specifies a time stamp increment value corresponding to the obtained transmission parameter; a time stamp calculating unit that updates the time stamp by adding the specified time stamp increment value to a previous time stamp; and a time stamp adding unit that adds the updated time stamp to the packets configuring the data stream.

According to one aspect of the present disclosure, a transmission parameter is obtained from a received data stream, and a time stamp increment value corresponding to the obtained parameter is specified. The time stamp is updated by adding the specified time stamp increment value to the previous time stamp, and the updated time stamp is added to the packets configuring the data stream.

Effects of the Invention

According to one aspect (first aspect) of the present disclosure, it is possible to generate a time stamp with a simple circuit structure realizing low cost.

BRIEF DESCRIPTION OF DRAWINGS

FIG. 8 is a diagram of an exemplary LUT.

MODE FOR CARRYING OUT THE INVENTION

Hereinafter, best modes (referred to as embodiments below) for carrying out the present disclosure will be described in detail with reference to the drawings.

<Outline of Present Disclosure>

If a transmission rate of a TS is constant, a transmission time per packet (fixed length) is constant. Therefore, a difference between time stamps of two continuous packets configuring the TS becomes constant. Therefore, if the transmission rate at the time when the TS is broadcasted is known and an initial value of the time stamp can be determined, the time stamp to be added to each packet of the TS can be calculated without using a clock recovery circuit.

On the other hand, in digital broadcasting standards such as digital television broadcasting that broadcasts the TS, the transmission rate can be calculated on the basis of transmission path encoding information in general. Therefore, a reception apparatus to which the present disclosure has been applied calculates the transmission rate from an encoding parameter corresponding to the transmission path encoding information and generates a time stamp by using the calculated transmission rate.

Specifically, a transmission parameter is obtained from the demodulation result of a reception signal, and a time stamp increment value is calculated on the basis of the obtained transmission parameter. Then, a time stamp value updated by incrementing the time stamp increment value is added to each packet. However, in the calculation process of the time stamp value, a value is expressed in a form of a rational number (a set of numerator and denominator) to avoid an accumulation of errors. Furthermore, the time stamp value can be initialized to a desired value when the received TSs are discontinuous such as the time of changing the channel.

Furthermore, normally, packets respectively corresponding to services (programs) are multiplexed in the TS. However, the packet of the service (program) selected by a user is output to the subsequent stage. As a result, a bit rate of the TS can be reduced.

<First Configuration Example of Reception Apparatus to which Present Disclosure has been Applied>

Figure 1:
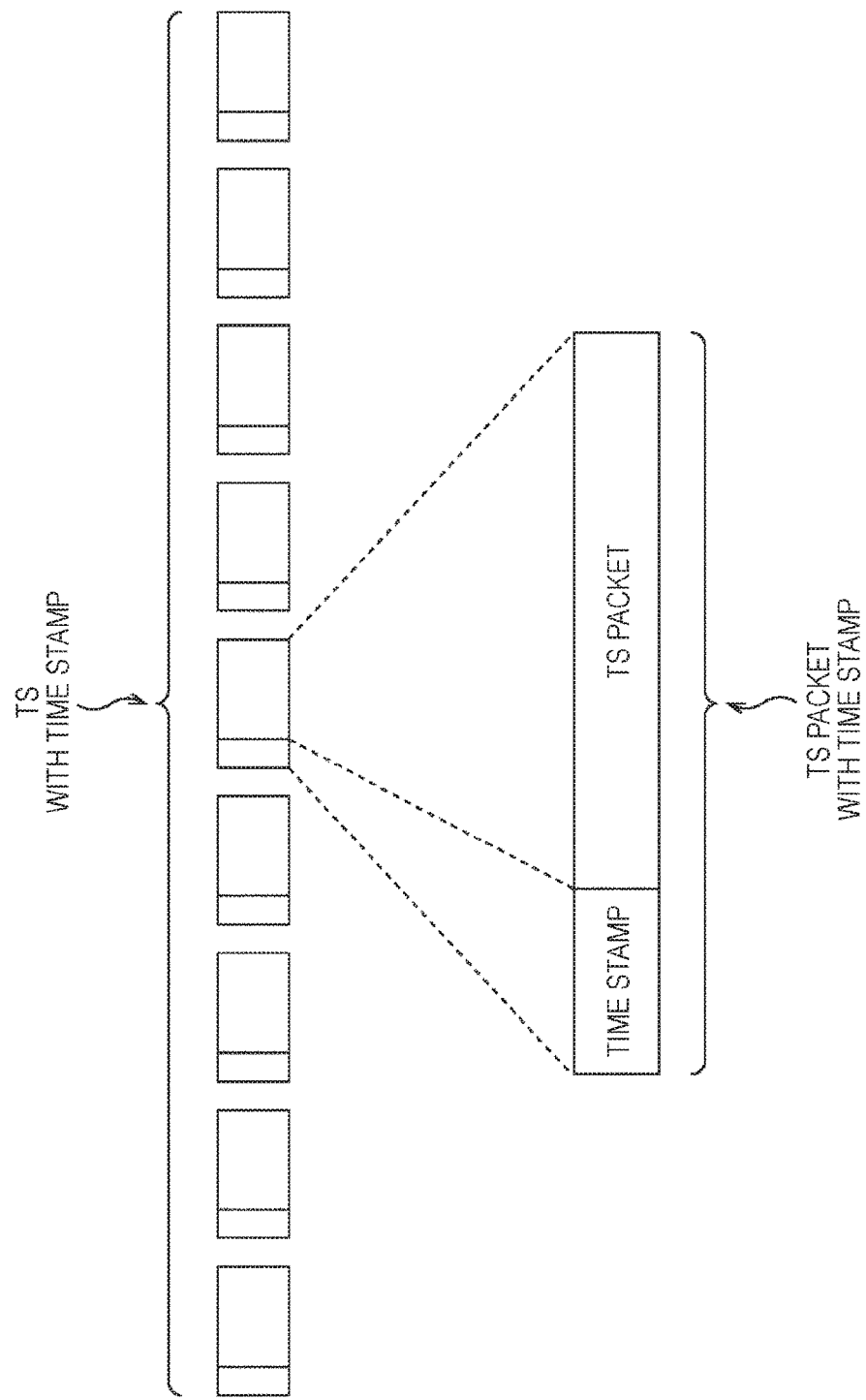
FIG. 1 is a diagram of a state where a time stamp is added to each packet of a TS.
Figure 2:
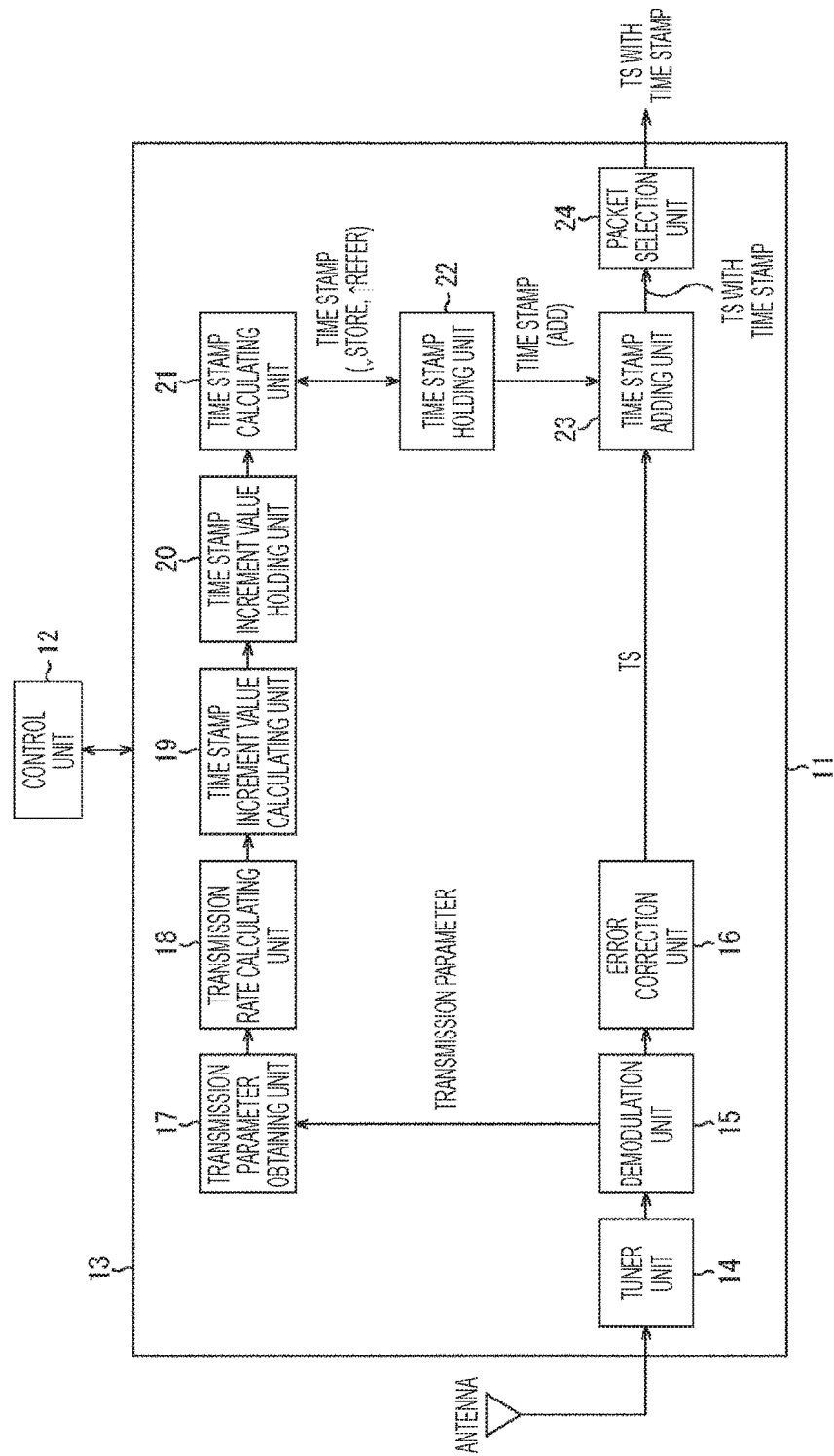
FIG. 2 is a block diagram of a first configuration example of a reception apparatus to which the present disclosure has been applied.

In FIG. 2, a first configuration example of a reception apparatus to which the present disclosure has been applied is illustrated. The reception apparatus 11 includes a control unit 12 and a reception processing unit 13. The control unit 12 controls the reception processing unit 13. Under the control of the control unit 12, the reception processing unit 13 obtains a TS from a broadcast wave input from an antenna or the like, adds a time stamp to each packet configuring the TS, and outputs it to a subsequent stage.

The reception processing unit 13 includes a tuner unit 14, a demodulation unit 15, an error correction unit 16, a transmission parameter obtaining unit 17, a transmission rate calculating unit 18, a time stamp increment value calculating unit 19, a time stamp increment value holding unit 20, a time stamp calculating unit 21, a time stamp holding unit 22, a time stamp adding unit 23, and a packet selection unit 24.

The tuner unit 14 obtains a signal (transmission path encoding signal) of the selected channel from the broadcast wave input from an antenna, a CATV cable, or the like and outputs the signal to the demodulation unit 15. The demodulation unit 15 performs demodulation processing such as synchronization processing and equivalent processing on the transmission path encoding signal from the tuner unit 14, and outputs the demodulated signal to the error correction unit 16. Furthermore, in response to a request from the transmission parameter obtaining unit 17, the demodulation unit 15 obtains a transmission parameter from the transmission path encoding signal from the tuner unit 14 and supplies the transmission parameter to the transmission parameter obtaining unit 17.

The error correction unit 16 performs error correction processing on the demodulated signal and outputs the signal (TS) on which the error correction processing has been performed to the time stamp adding unit 23.

The transmission parameter obtaining unit 17 requests the transmission parameter to the demodulation unit 15 and outputs the obtained transmission parameter to the transmission rate calculating unit 18. The transmission rate calculating unit 18 calculates the transmission rate (to be described in detail later) on the basis of the transmission parameter and notifies the time stamp increment value calculating unit 19.

Furthermore, the transmission rate notified to the time stamp increment value calculating unit 19 is transmitted in a form of rational numbers. In addition, it is assumed that values to be exchanged between components in the subsequent stages are transmitted in the form of rational numbers to avoid an accumulation of errors.

The time stamp increment value calculating unit 19 calculates a time stamp increment value on the basis of the transmission rate notified from the transmission rate calculating unit 18 (to be described in detail later), and supplies the calculated time stamp increment value to the time stamp increment value holding unit 20. The time stamp increment value holding unit 20 temporarily holds the time stamp increment value supplied from the time stamp increment value calculating unit 19.

The time stamp calculating unit 21 calculates a value of the time stamp added to the next packet on the basis of the value of the time stamp added to the previous packet held by the time stamp holding unit 22 and the time stamp increment value held by the time stamp increment value holding unit 20 (to be described in detail later) and notifies the time stamp holding unit 22 of the calculated value of the time stamp.

The time stamp holding unit 22 supplies the holding value of the time stamp to the time stamp calculating unit 21 and updates the holding value of the time stamp with the value of the time stamp notified from the time stamp calculating unit 21. Furthermore, the time stamp holding unit 22 initializes the holding value of the time stamp to an initial value (for example, zero) under the control of the control unit 12.

The time stamp adding unit 23 adds the time stamp held by the time stamp holding unit 22 to each packet of the signal (TS), of which the error has been corrected, input from the error correction unit 16 and outputs it to the packet selection unit 24. Furthermore, the time stamp adding unit 23 adds the time stamps to all the packets. However, the time stamps may be added to the packets having predetermined intervals therebetween, not all the packets.

Under the control of the control unit 12, the packet selection unit 24 selects the designated packet (such as packet corresponding to program selected by user) out of the packets to which the time stamps have been added and outputs the selected packet to the subsequent stage.

<Operation of Reception Apparatus 11>

Next, an operation of the reception apparatus 11 is described with reference to FIGS. 3 to 5.

Figure 3:
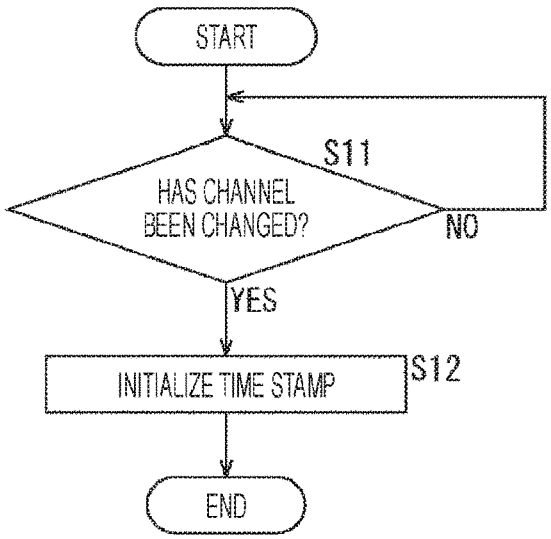
FIG. 3 is a flowchart to describe an operation by the first configuration example of the reception apparatus.

FIG. 3 is processing for coping with the change of the channel. The processing is repeatedly executed while the reception apparatus 11 outputs the TS with the time stamp.

In step S11, the control unit 12 confirms whether the channel has been changed and waits until the channel is changed. In a case where the channel has been changed, the procedure proceeds to step S12, and the time stamp holding unit 22 initializes the holding value of the time stamp under the control of the control unit 12. After that, the processing starts again from step S11.

Figure 4:
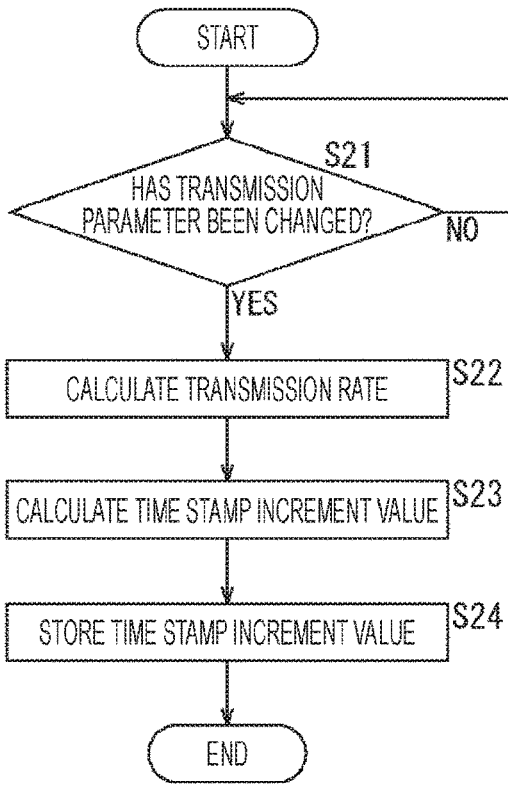
FIG. 4 is a flowchart to describe an operation by the first configuration example of the reception apparatus.

FIG. 4 is processing for coping with switching of the transmission parameters. The processing is repeatedly executed while the reception apparatus 11 outputs the TS with the time stamp.

In step S21, the control unit 12 confirms whether the transmission parameter obtained by the transmission parameter obtaining unit 17 from the demodulation unit 15 has been changed, and waits until the transmission parameter is changed. In a case where the transmission parameter has been changed, the procedure proceeds to step S22. In step S22, the transmission rate calculating unit 18 calculates the transmission rate again on the basis of the changed transmission parameter under the control of the control unit 12 and notifies the time stamp increment value calculating unit 19 of the calculated transmission rate.

In step S23, the time stamp increment value calculating unit 19 calculates the time stamp increment value again on the basis of the calculated transmission rate, and supplies the calculated time stamp increment value to the time stamp increment value holding unit 20. In step S24, the time stamp increment value holding unit 20 stores the newly supplied time stamp increment value. After that, the processing starts again from step S21.

Figure 5:
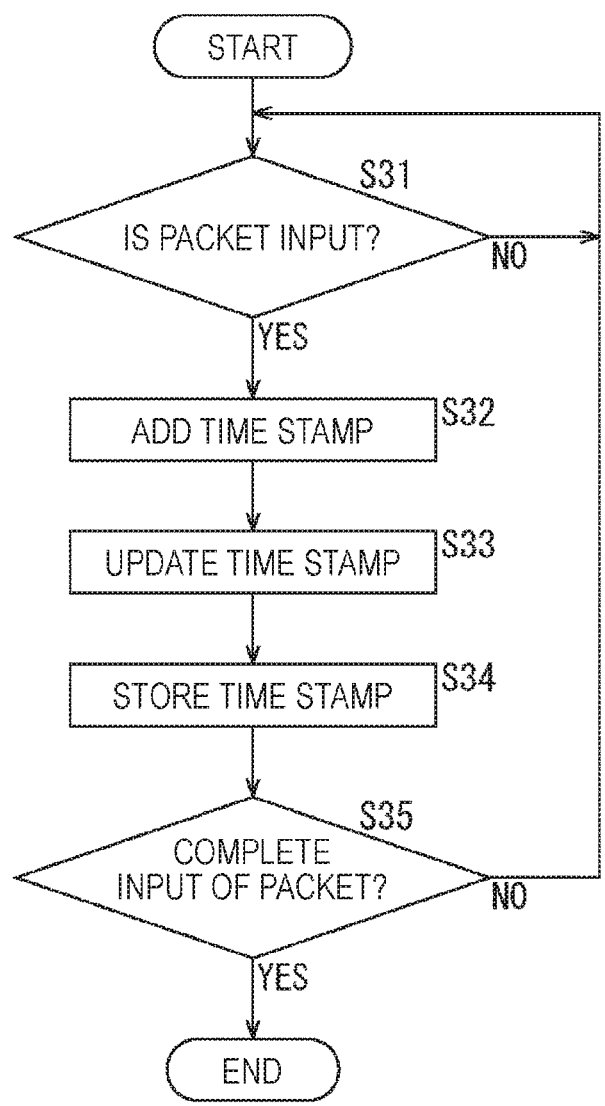
FIG. 5 is a flowchart to describe an operation by the first configuration example of the reception apparatus.

FIG. 5 is processing for adding the time stamp to each packet configuring the TS of which the error has been corrected.

In step S31, the time stamp adding unit 23 confirms whether the packet of the TS of which the error has been corrected is input from the error correction unit 16 and waits for the input of the packet. In a case where the packet has been input, the procedure proceeds to step S32. In step S32, the time stamp adding unit 23 adds the time stamp held by the time stamp holding unit 22 to the packet input from the error correction unit 16.

In step S33, the time stamp calculating unit 21 calculates a value of a new time stamp and notifies the time stamp holding unit 22 of the new value. In step S34, the time stamp holding unit 22 updates the value of the time stamp which is currently held to the value of the new time stamp.

In step S35, the control unit 12 determines whether the input of the packet to the time stamp adding unit 23 has been completed, and returns the procedure to step S31 until the control unit 12 determines that the input of the packet has been completed, and then, repeats the subsequent processing. In step S35, in a case where it has been determined that the input of the packet to the time stamp adding unit 23 has been completed, the processing is terminated.

Furthermore, it is assumed that the respective processing described with reference to FIGS. 3 to 5 is executed in parallel.

As described above, according to the reception apparatus 11, it is possible to generate a highly accurate time stamp with a simple circuit structure realizing low cost and to add the time stamp to the packet of the TS.

<Calculation Method of Time Stamp>

Next, a calculation method of the time stamp is specifically described.

The calculation method of the transmission rate depends on the digital broadcast standard. For example, in satellite digital broadcasting standards (BS digital broadcasting) in Japan, in a case where a modulation system is TC8PSK, a transmission rate R can be calculated by the following formula (1).

$$R=(2/3)*3*S*(204/208)*(188/204)*(N/48) \quad (1)$$

However, the unit of the transmission rate R is bit per second (Mbps). The reference S in the formula (1) is a symbol rate (28.860 Mbaud). The reference N is the number of allocated slots (integer from zero to 48). The number of allocated slots N as a transmission parameter is transmitted as a part of transmission and multiplexing configuration control (TMCC) information. The TMCC information is a control signal which is transmitted separately from the TS. The reception side performs demodulation processing and error correction processing on the basis of the TMCC information.

The time stamp increment value (ΔT) can be calculated by the following formula (2).

$$\Delta T=188*8*F/R \quad (2)$$

However, the reference F in the formula (2) indicates a reference clock frequency (27 MHz).

The time stamp value T(i) (i is an integer) to be added to the ith packet is calculated by using the following formula (3).

$$T(i)=T(I-1)+\Delta T \quad (3)$$

However, T(0) in a case of i=1 in the formula (3) is an initial value of the time stamp (for example, zero).

Furthermore, in the specific example described above, the calculation method coping with the satellite digital broadcasting standard (BS digital broadcasting) in Japan has been described. However, the present disclosure is not limited to the above and can be applied to all kinds of digital broadcasting standards.

<Countermeasures for Avoiding Calculation Error Accumulation>

In the calculation process by the time stamp calculating unit 21, in a case where the calculation results of each stage are expressed by real numbers of a finite number of digits, roundoff errors are accumulated. Therefore, in the reception processing unit 13, the accumulation of the errors is avoided by using rational numbers (set of numerator and denominator) in order to exchange numerical values between the components.

A case where the modulation system of the satellite digital broadcasting standard (BS digital broadcasting) in Japan is TC8PSK is described as an example below. Note that it is assumed that the number of allocated slots N=22.

In this case, the transmission rate R can be expressed by rational numbers as follows on the basis of the formula (1).

$$R=(2/3)*3*(28860/1000)*(204/208)*(188/204)*(22/48)=19129/800$$

Furthermore, in this case, the time stamp increment value ΔT can be expressed by rational numbers as follows on the basis of the formula (2).

$$\Delta T=188*8*27*800/19129=1698+114/407$$

Therefore, for example, the time stamp T(i) can be expressed by rational numbers as follows in a case where i is one to eight. However, it is assumed that an initial value T(0) of the time stamp satisfy T(0)=0.

$$T(1)=T(0)+\Delta T=1698+114/407$$

$$T(2)=T(1)+\Delta T=3396+228/407$$

$$T(3)=T(2)+\Delta T=5094+342/407$$

$$T(4)=T(3)+\Delta T=6792+456/407=6793+49/407$$

$$T(5)=T(4)+\Delta T=8491+163/407$$

$$T(6)=T(5)+\Delta T=10189+277/407$$

$$T(7)=T(6)+\Delta T=11887+391/407$$

$$T(8)=T(7)+\Delta T=13585+505/407=13586+98/407$$

Furthermore, the part of integers of the above numerical values is a value which is actually added to the TS packet as a time stamp. For example, 1698 is added as a time stamp T(1). 3396 is added as a time stamp T(2). 5094 is added as a time stamp T(3). 6793 is added as a time stamp T(4). 8491 is added as a time stamp T(5). 10189 is added as a time stamp T(6). 11887 is added as a time stamp T(7). 13586 is added as a time stamp T(8).

<Second Configuration Example of Reception Apparatus to which Present Disclosure has been Applied>

As described above, since the calculations of the transmission rate R, the time stamp increment value ΔT, and the time stamp T(i) include multiplication and division, processing cost becomes high. Therefore, instead of calculating the transmission rate R and the time stamp increment value ΔT, by using a look up table (LUT) in which the time stamp increment value ΔT is associated with the transmission parameter, the processing cost of the calculation can be reduced.

Figure 6:
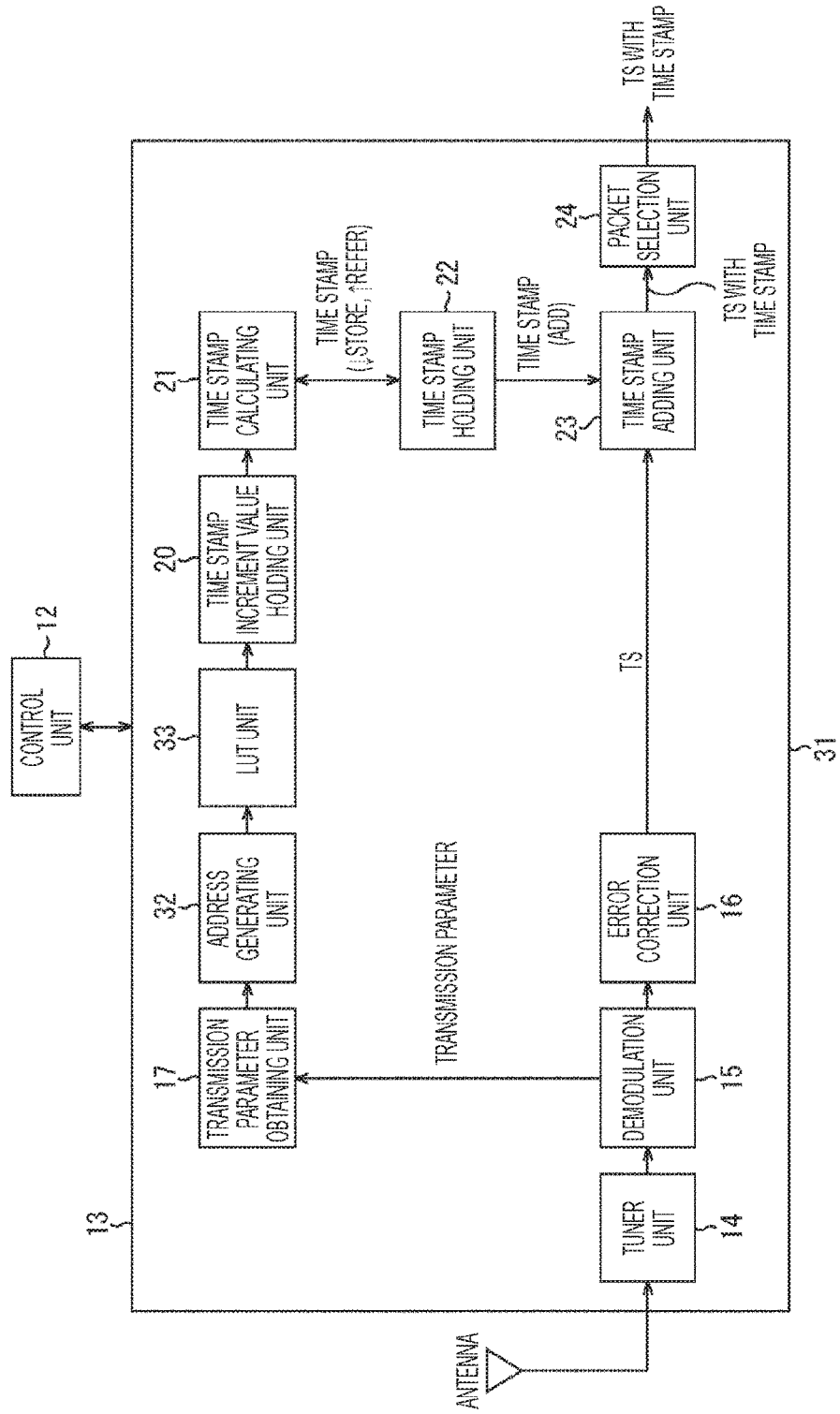
FIG. 6 is a block diagram of a second configuration example of a reception apparatus to which the present disclosure has been applied.

In FIG. 6, a second configuration example of a reception apparatus to which the present disclosure has been applied is illustrated. The reception apparatus 31 uses the LUT instead of calculating the transmission rate R and the time stamp increment value ΔT. Furthermore, in the reception apparatus 31, the transmission rate calculating unit 18 and the time stamp increment value calculating unit 19 in the reception apparatus 11 illustrated in FIG. 2 are respectively replaced with an address generating unit 32 and an LUT unit 33. The other components common to those of the reception apparatus 11 are denoted with the same reference numerals, and the description is appropriately omitted.

On the basis of the transmission parameter supplied from the transmission parameter obtaining unit 17, the address generating unit 32 generates an address value to be notified to the LUT unit 33. The LUT unit 33 holds an LUT in which the time stamp increment value ΔT is associated with the transmission parameter and reads the time stamp increment value ΔT stored in the address value corresponding to the transmission parameter, which is notified from the address generating unit 32. Then, the LUT unit 33 supplies the read value to the time stamp increment value holding unit 20. Furthermore, the time stamp increment value ΔT stored in the LUT unit 33 is expressed in the form of a rational number (set of numerator and denominator).

<Operation of Reception Apparatus 31>

Next, an operation of the reception apparatus 31 is described. However, processing for cope with the change of the channel and processing to add the time stamp to each packet configuring the TS of which the error has been corrected are similar to the operation of the reception apparatus 11. Therefore, the description on the above processing is omitted.

Figure 7:
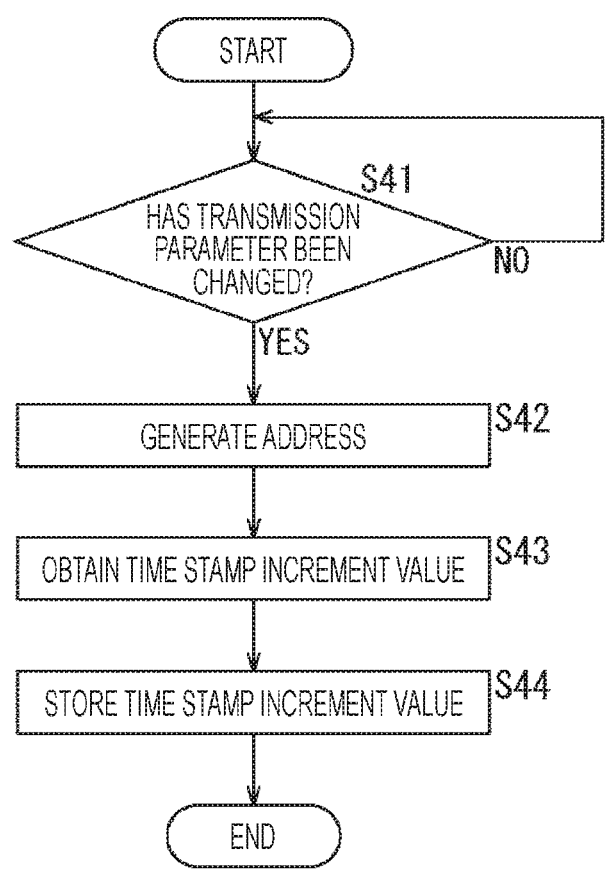
FIG. 7 is a flowchart to describe an operation by the second configuration example of the reception apparatus.

FIG. 7 is processing for coping with switching of the transmission parameters by the reception apparatus 31. The processing is repeatedly executed while the reception apparatus 31 outputs the TS with the time stamp.

In step S41, the control unit 12 confirms whether the transmission parameter obtained by the transmission parameter obtaining unit 17 from the demodulation unit 15 has been changed and waits until the transmission parameter is changed. In a case where the transmission parameter has been changed, the procedure proceeds to step S42. In step S42, under the control of the control unit 12, the address generating unit 32 generates an address value corresponding to the changed transmission parameter and notifies the LUT unit 33 of the generated address value.

In step S43, the LUT unit 33 supplies the time stamp increment value stored in the notified address value to the time stamp increment value holding unit 20. In step S44, the time stamp increment value holding unit 20 stores the newly supplied time stamp increment value. After that, the processing starts again from step S41.

As described above, according to the reception apparatus 11, it is possible to generate a highly accurate time stamp with a simple circuit structure realizing low cost and to add the time stamp to the packet of the TS.

<Example of LUT>

Here, an example of the LUT held by the LUT unit 33 is described. FIG. 8 is an example of the LUT using the number of allocated slots N as an encoding parameter, as an address, in a case where the modulation system of the satellite digital broadcasting standard (BS digital broadcasting) in Japan is TC8PSK.

For example, in a case where the number of allocated slots N as an encoding parameter is one, the address generating unit 32 generates one as an address value and notifies the LUT unit 33. The LUT unit 33 reads a time stamp increment value $\Delta T=37362+6/37$ stored in the address value 1 and supplies it to the time stamp increment value holding unit 20.

<Example of Outputs of Reception Apparatuses 11 and 31 in a Case where Transmission Rate is Constant>

Figure 9:
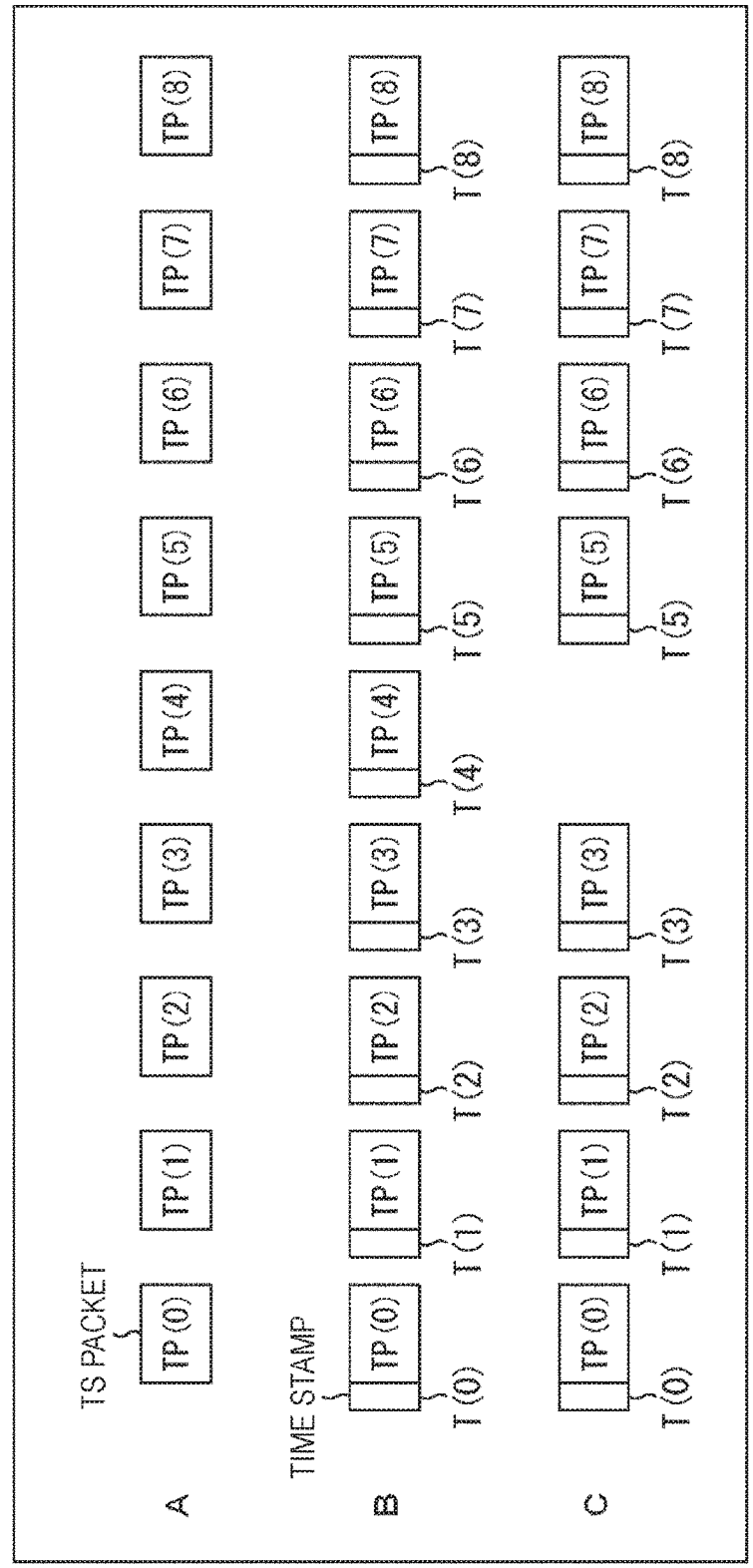
FIG. 9 is a diagram of exemplary outputs in a case where a transmission rate of the TS is constant.

In FIG. 9, examples of outputs of the reception apparatuses 11 and 31 in a case where the transmission rate of the TS which has been received is constant.

That is, in FIG. 9A, an arrangement of the packets output from the error correction unit 16 is illustrated. In FIG. 9B, an arrangement of the packets with the time stamps output from the time stamp adding unit 23 is illustrated. In FIG. 9C, an arrangement of the packets with the time stamps output from the packet selection unit 24 is illustrated. In a case of FIG. 9C, it is assumed that the packet (TP(4)) with a packet number i=4 be not corresponding to a desired service, and the packet is discarded.

Figure 10:
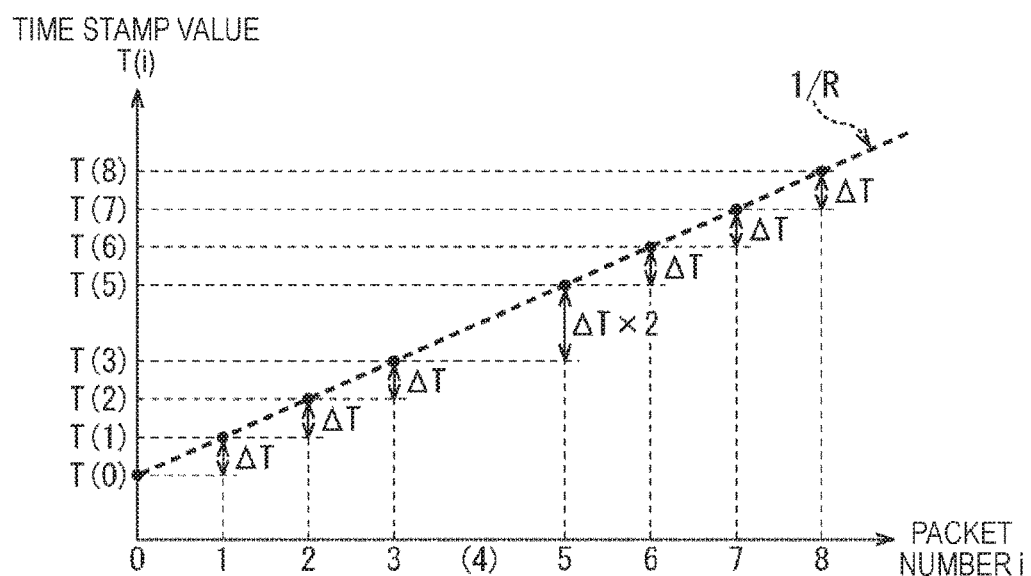
FIG. 10 is a diagram of a time stamp in a case where the transmission rate of the TS is constant.

Next, FIG. 10 is plotted values of the time stamp added to the packet with the time stamp illustrated in C of FIG. 9. In FIG. 10, the horizontal axis indicates a packet number i and the vertical axis indicates a time stamp value T(i) corresponding to the packet number i. Note that the time stamp value of the first packet TP(0) is T(0).

Since the time stamp value T(i) is incremented by the time stamp increment value ($\Delta T$), the value T(i) is monotonically increased. However, since TP(4) is discarded in the example in C of FIG. 9, the time stamp value becomes discontinuous in that part, and a difference between T(3) and T(5) is twice as large as $\Delta T$.

<Example of Outputs of Reception Apparatuses 11 and 31 in a Case where Transmission Rate is Changed During Reception>

Figure 11:
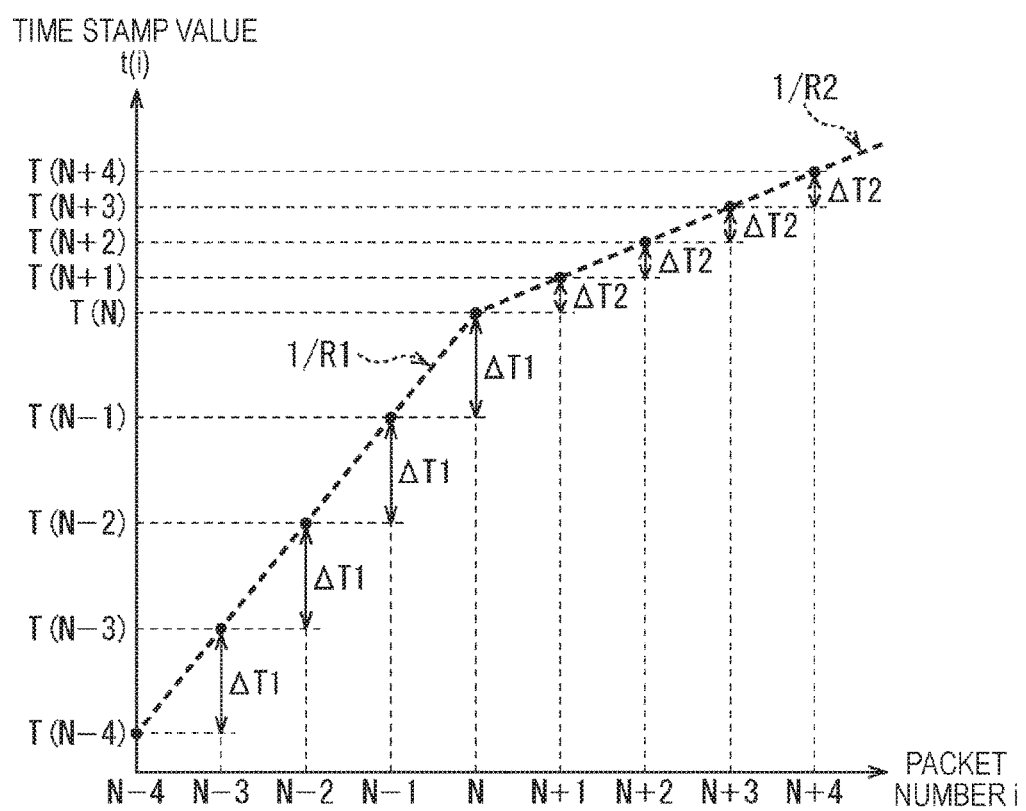
FIG. 11 is a diagram of a time stamp in a case where the transmission rate of the TS is changed during reception.

FIG. 11 is plotted values of time stamps added to packets output from the reception apparatuses 11 and 31 in a case where the transmission rate is changed during reception. In FIG. 11, the horizontal axis indicates a packet number i and the vertical axis indicates a time stamp value T(i) corresponding to the packet number i.

In the example illustrated in FIG. 11, the transmission rate is changed from R1 to R2 (>R1) between a packet with a packet number i=N−1 and a packet with a packet number i=N. In this case, the time stamp increment value $\Delta T$ is changed from $\Delta T1$ to $\Delta T2$ (<$\Delta T1$) between the packet with the packet number i=N and the packet with the packet number i=N+1 according to the change of the transmission rate.

<Example of Outputs of Reception Apparatuses 11 and 31 in a Case where Channel has been Changed>

Figure 12:
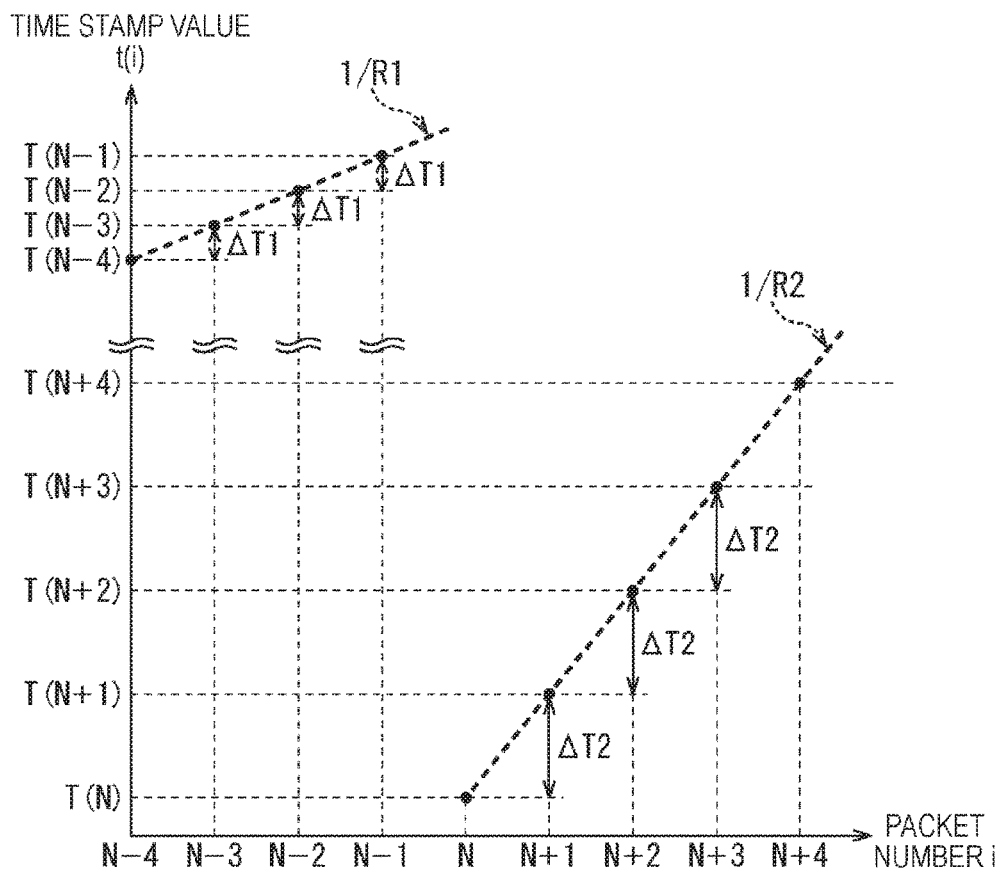
FIG. 12 is a diagram of a time stamp in a case where a channel is changed.

FIG. 12 is plotted values of the time stamps added to the packets output from the reception apparatuses 11 and 31 in a case where the channel has been changed.

In the example illustrated in FIG. 12, the channel has been changed between the packet with the packet number i=N−1 and the packet with the packet number i=N, and the transmission rate is changed from R1 before the channel change to R2 (<R1) after the channel change. In this case, the time stamp increment value $\Delta T$ is changed from $\Delta T$ to $\Delta T2$ (>$\Delta T1$) between the packet with the packet number i=N and the packet with the packet number i=N+1 according to the change of the transmission rate. Furthermore, since the time stamp is initialized in accordance with the change of the channel, the time stamp becomes a discontinuous value.

<Application of Reception Apparatus 11>

Figure 13:
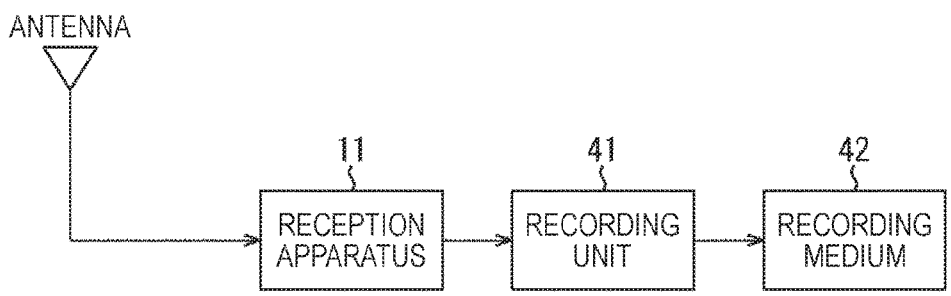
FIG. 13 is a block diagram of a configuration example in a case where the reception apparatus is applied to a recording system.

In FIG. 13, a configuration example is illustrated in a case where the reception apparatus 11 (or reception apparatus 31) is applied to a recording system that records a broadcast TS on a recording medium. In the recording system, the TS with the time stamp output from the reception apparatus 11 is supplied to a recording unit 41 and is recorded on the recording medium 42. The recording medium 42 is, for example, a DVD, a Blu-ray (registered trademark) disc, a hard disk drive, a flash memory, or the like.

Figure 14:
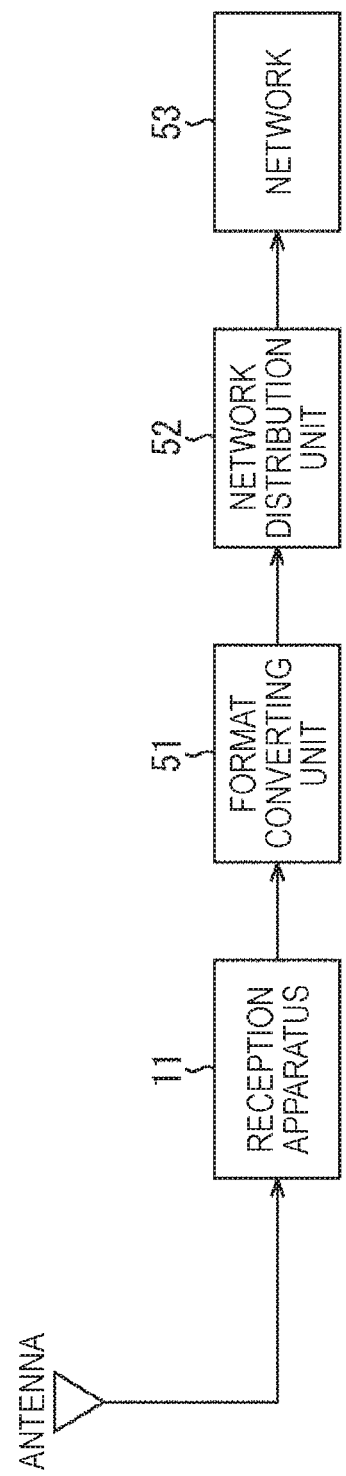
FIG. 14 is a block diagram of a configuration example in a case where the reception apparatus is applied to a distribution system.

In FIG. 14, a configuration example is illustrated in a case where the reception apparatus 11 (or reception apparatus 31) is applied to a distribution system that distributes the broadcast TS to the network. In the distribution system, the TS with the time stamp output from the reception apparatus 11 is converted into a format (real-time transport protocol (RTP) and the like) suitable for network distribution by a format converting unit 51 and is supplied to a network distribution unit 52. Then, the TS with the time stamp format-converted by the network distribution unit 52 is distributed to a network 53.

The above-mentioned series of processing can be performed by hardware and software. In a case where the series of the processing is performed by the software, a program included in the software is installed in a computer. Here, the computer includes a computer incorporated in dedicated hardware and, for example, a general personal computer which can perform various functions by installing various programs.

Figure 15:
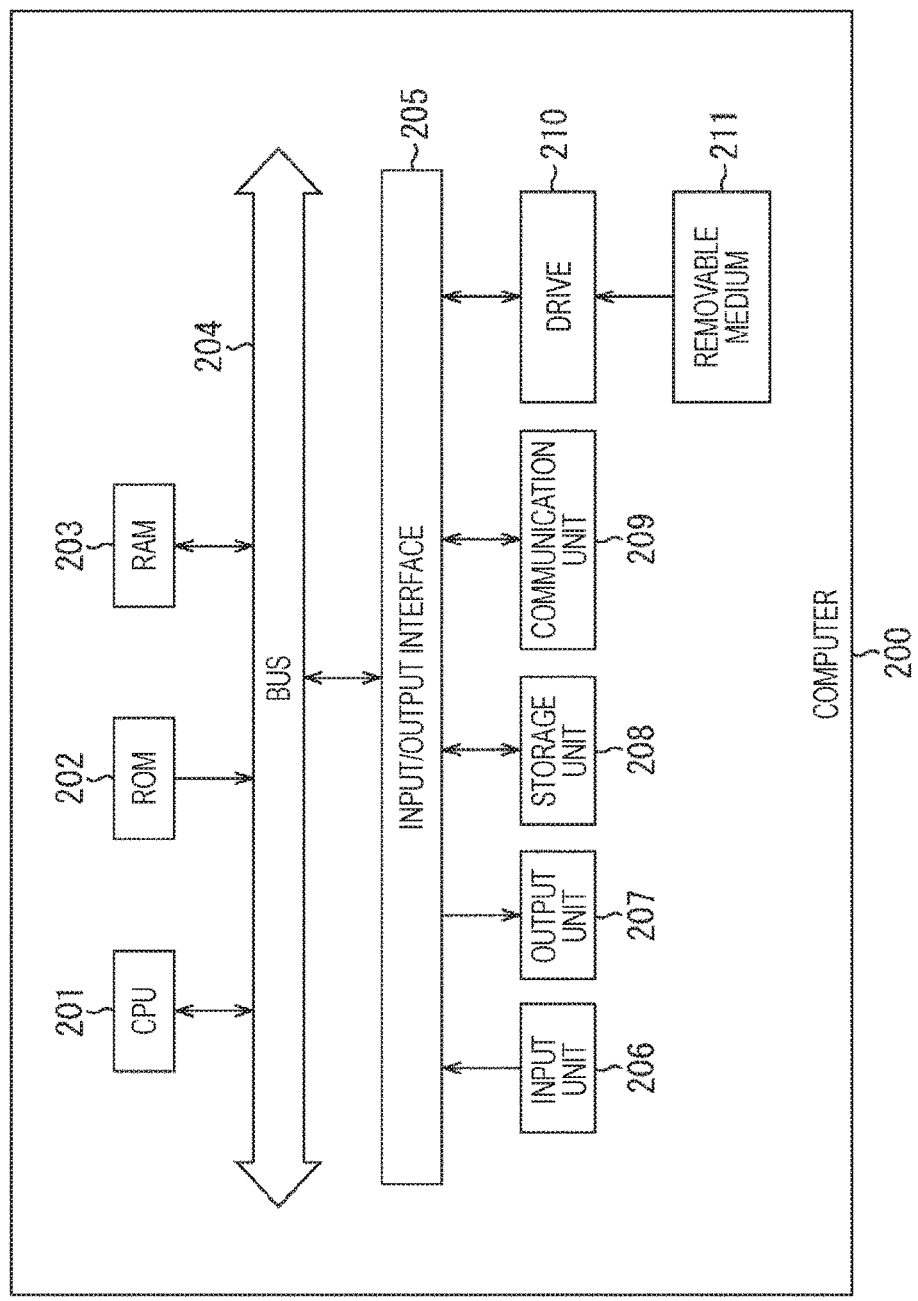
FIG. 15 is a block diagram of a configuration example of a general-purpose computer.

FIG. 15 is a block diagram of an exemplary configuration of hardware of the computer for executing the above-mentioned series of processing by the program.

In a computer 200, a central processing unit (CPU) 201, a read only memory (ROM) 202, and a random access memory (RAM) 203 are connected to each other with a bus 204.

In addition, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone, and the like. The output unit 207 includes a display, a speaker, and the like. The storage unit 208 includes a hard disk, a non-volatile memory, and the like. The communication unit 209 includes a network interface and the like. The drive 210 drives a removable medium 211 such as a magnetic disk, an optical disk, an optical magnetic disk, or a semiconductor memory.

In the computer 200 configured as above, the CPU 201 loads, for example, a program stored in the storage unit 208 to the RAM 203 via the input/output interface 205 and the bus 204 and executes the program so that the above-mentioned series of processing is executed.

In addition, the embodiment of the present disclosure is not limited to the embodiment described above and can be variously changed without departing from the scope of the present disclosure.

The present disclosure may have a structure below.

(1)

A reception apparatus including:

a reception unit configured to receive a data stream formed of a series of packets;

an obtaining unit configured to obtain a transmission parameter from the received data stream;

a time stamp increment value specifying unit configured to specify a time stamp increment value corresponding to the obtained transmission parameter;

a time stamp calculating unit configured to update the time stamp by adding the specified time stamp increment value to a previous time stamp; and a time stamp adding unit configured to add the updated time stamp to the packets configuring the data stream.

(2)

The reception apparatus according to (1), in which the time stamp increment value specifying unit includes:

a transmission rate calculating unit that calculates the transmission rate on the basis of the obtained transmission parameter; and a time stamp increment value calculating unit that calculates the time stamp increment value on the basis of the calculated transmission rate.

(3)

The reception apparatus according to (1), in which the time stamp increment value specifying unit has a conversion table in which the time stamp increment value is associated with the obtained transmission parameter.

(4)

The reception apparatus according to any one of (1) to (3), in which in a case where the obtained transmission parameter is changed, the time stamp increment value specifying unit specifies the time stamp increment value corresponding to the changed transmission parameter.

(5)

The reception apparatus according to any one of (1) to (4), in which the time stamp calculating unit initializes the time stamp in a case where a channel to receive the data stream is changed.

(6)

The reception apparatus according to any one of (1) to (5), in which the transmission rate, the time stamp increment value, and the time stamp are expressed as rational numbers.

(7)

The reception apparatus according to any one of (1) to (6), further including:

a packet selection unit configured to selectively output the packet to which the time stamp has been added.

(8)

A receiving method of a reception apparatus, including the steps, performed by the reception apparatus of:

a receiving step of receiving a data stream formed of a series of packets;

an obtaining of obtaining a transmission parameter from the received data stream;

a time stamp increment value specifying step of specifying a time stamp increment value corresponding to the obtained transmission parameter;

a time stamp calculating step of updating the time stamp by adding the specified time stamp increment value to a previous time stamp; and a time stamp adding step of adding the updated time stamp to the packets configuring the data stream.

(9)

A program for causing a computer to function as:

a reception unit that receives a data stream formed of a series of packets;

an obtaining unit that obtains a transmission parameter from the received data stream;

a time stamp increment value specifying unit that specifies a time stamp increment value corresponding to the obtained transmission parameter;

a time stamp calculating unit that updates the time stamp by adding the specified time stamp increment value to a previous time stamp; and a time stamp adding unit that adds the updated time stamp to the packets configuring the data stream.

REFERENCE SIGNS LIST

11 Reception apparatus
12 Control unit
13 Reception processing unit
14 Tuner unit
15 Demodulation unit
16 Error correction unit
17 Transmission parameter obtaining unit
18 Transmission rate calculating unit
19 Time stamp increment value calculating unit
20 Time stamp increment value holding unit
21 Time stamp calculating unit
22 Time stamp holding unit
23 Time stamp adding unit
24 Packet selection unit
31 Reception apparatus
32 Address generating unit
33 LUT unit
200 Computer
201 CPU
202 ROM
203 RAM
204 Bus
205 Input/output interface
206 Input unit
207 Output unit
208 Storage unit
209 Communication unit
210 Drive
211 Removable medium

The invention claimed is:

1. A reception apparatus comprising:

a processor; and a memory, the memory storing program code executable by the processor to perform operations comprising:

receiving a data stream formed of a series of packets;

obtaining a transmission parameter from the received data stream;

specifying a time stamp increment value corresponding to the obtained transmission parameter to provide a specified time stamp increment value;

updating a time stamp by adding the specified time stamp increment value to a previous time stamp;

adding the updated time stamp to the packets configuring the data stream; and selectively outputting the packets to which the updated time stamp has been added, wherein specifying the time stamp increment value includes calculating a transmission rate on the basis of the obtained transmission parameter and determining the time stamp increment value on the basis of the calculated transmission rate.

2. The reception apparatus according to claim 1, wherein in a case where the obtained transmission parameter is changed, the time stamp increment value is specified corresponding to the changed transmission parameter.

3. The reception apparatus according to claim 1,
wherein the operations comprise initializing the time stamp in a case where a channel to receive the data stream is changed.

4. The reception apparatus according to claim 1,
wherein the transmission rate, the time stamp increment value, and the time stamp are expressed as rational numbers.

5. The reception apparatus according to claim 1, wherein the transmission parameter is at least one of a transmission rate, a reference clock frequency or a number of allocated slots.

6. A receiving method of a reception apparatus, comprising the steps, performed by the reception apparatus, of:
receiving a data stream formed of a series of packets;
obtaining a transmission parameter from the received data stream;
specifying a time stamp increment value corresponding to the obtained transmission parameter to provide a specified time stamp increment value;
updating a time stamp by adding the specified time stamp increment value to a previous time stamp;
adding the updated time stamp to the packets configuring the data stream; and
selectively outputting the packets to which the updated time stamp has been added,
wherein specifying the time stamp increment value includes calculating a transmission rate on the basis of the obtained transmission parameter and determining the time stamp increment value on the basis of the calculated transmission rate.

7. The method according to claim 6,
wherein in a case where the obtained transmission parameter is changed, the time stamp increment value is specified corresponding to the changed transmission parameter.

8. The method according to claim 6, further comprising:
initializing the time stamp in a case where a channel to receive the data stream is changed.

9. The method according to claim 6,
wherein the transmission rate, the time stamp increment value, and the time stamp are expressed as rational numbers.

10. The method according to claim 6, wherein the transmission parameter is at least one of a transmission rate, a reference clock frequency or a number of allocated slots.

11. A non-transitory computer readable medium storing program code for data stream reception, the program code being executable by a processor to perform operations comprising:
receiving a data stream formed of a series of packets;
obtaining a transmission parameter from the received data stream;
specifying a time stamp increment value corresponding to the obtained transmission parameter to provide a specified time stamp increment value;
updating a time stamp by adding the specified time stamp increment value to a previous time stamp;
adding the updated time stamp to the packets configuring the data stream; and
selectively outputting the packets to which the updated time stamp has been added,
wherein specifying the time stamp increment value includes calculating a transmission rate on the basis of the obtained transmission parameter and determining the time stamp increment value on the basis of the calculated transmission rate.

12. The non-transitory computer readable medium according to claim 11,
wherein in a case where the obtained transmission parameter is changed, the time stamp increment value is specified corresponding to the changed transmission parameter.

13. The non-transitory computer readable medium according to claim 11,
wherein the operations further comprise initializing the time stamp in a case where a channel to receive the data stream is changed.

14. The non-transitory computer readable medium according to claim 11,
wherein the transmission rate, the time stamp increment value, and the time stamp are expressed as rational numbers.

15. The non-transitory computer readable medium according to claim 11, wherein the transmission parameter is at least one of a transmission rate, a reference clock frequency or a number of allocated slots.

* * * * *